Figure 1:
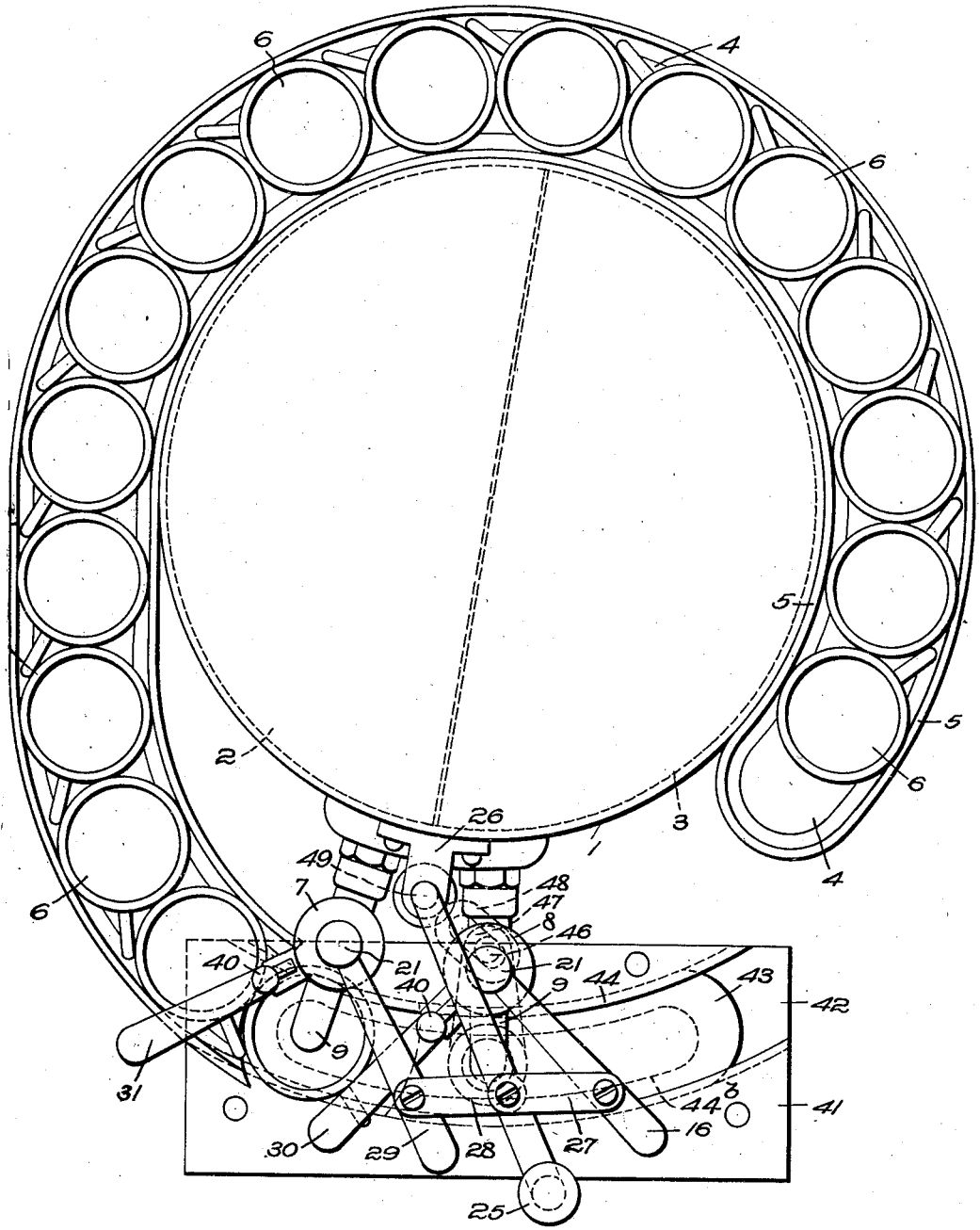

Nov. 10, 1931.                G. M. KENDALL                1,831,357
                         BEVERAGE DISPENSING DEVICE
                    Filed April 13, 1928     3 Sheets-Sheet 2

Inventor:
George M. Kendall,

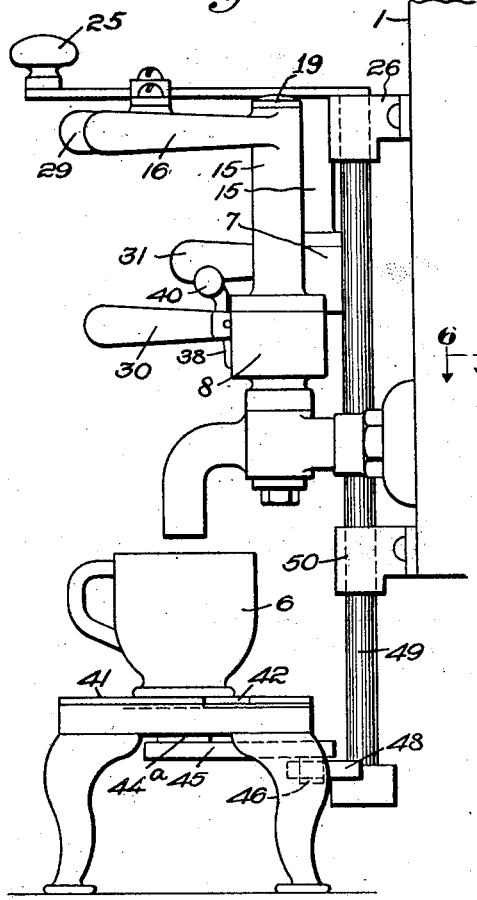
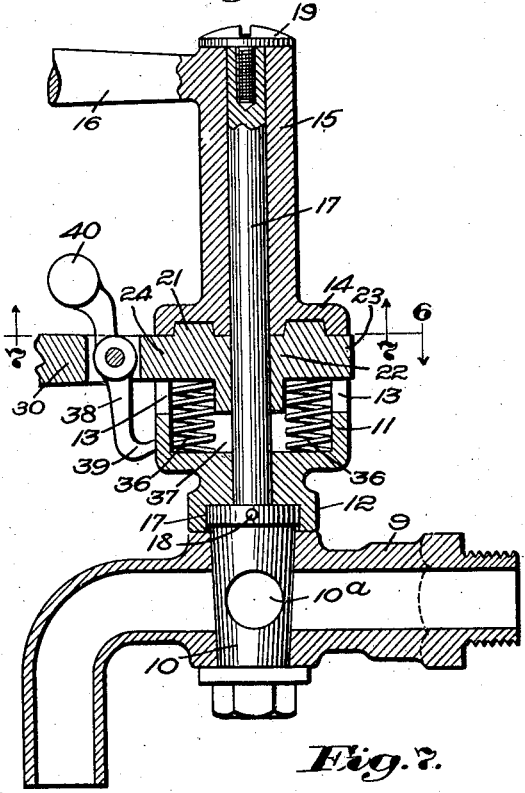
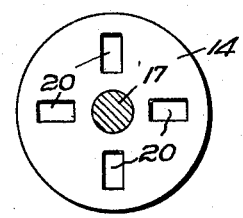
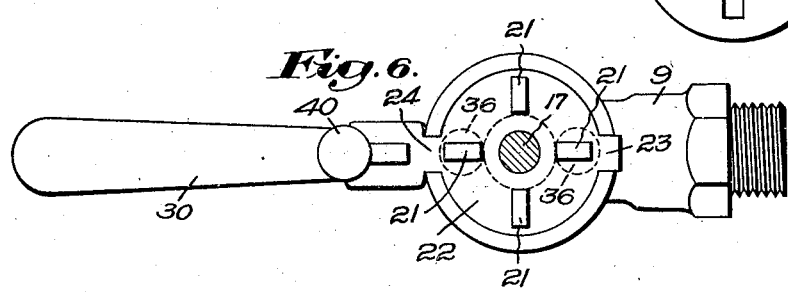

Patented Nov. 10, 1931

1,831,357

UNITED STATES PATENT OFFICE

GEORGE M. KENDALL, OF BROOKLINE, MASSACHUSETTS

BEVERAGE DISPENSING DEVICE

Application filed April 13, 1928. Serial No. 269,833.

This invention relates to containers, as urns or the like for dispensing coffee, tea, milk, or similar beverages, and aims to provide a novel construction having, among others, the advantages hereinafter described.

Figure 2:
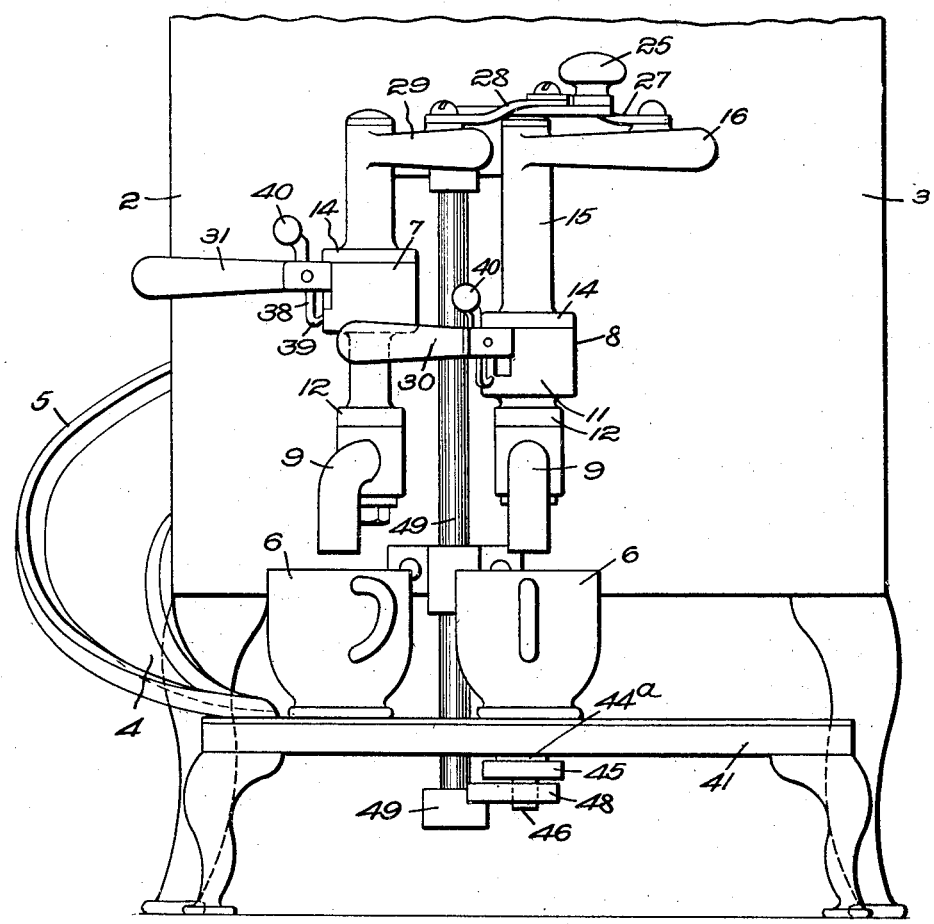
Figure 3:
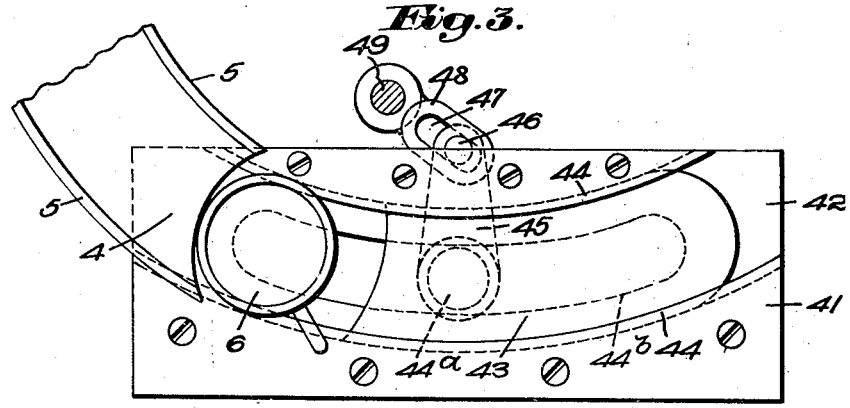

In the drawings of one embodiment of my invention selected for illustration and description herein,

Fig. 1 is a plan;

Fig. 2, a partial front elevation;

Fig. 3, a detail plan of the cup carrying or feeding means;

Fig. 4, a side elevation of the faucet construction and connections with the cup feeding means;

Fig. 5, a vertical section of one of the faucets partially broken away;

Fig. 6, a partial section on the line 6—6, Fig. 5; and

Fig. 7, a similar view on the line 7—7, Fig. 5.

Referring first to Figs. 1 and 2, my novel construction may comprise an urn 1, divided into a plurality of compartments 2, 3, of desired size. Of course, if preferred, a plurality of separate containers, side by side, can be used. Such an urn as is referred to is adapted for serving coffee, tea or the like from one compartment, and hot milk, cream or the like, from the other compartment; or one compartment alone may be used if preferred.

My improved construction is designed to facilitate the serving of beverages from the urn, and to that end is provided with a novel cup holding, feeding and filling means, which I will describe.

Secured about the outside of the urn, Figs. 1, 2, and in this case to it, is a suitable inclined cup magazine or chute 4, preferably of metal, with raised sides or rims 5 to receive and feed forwardly by gravity as needed, the cups 6 to the faucets 7, 8, the former faucet leading to one compartment or urn 2, as for milk. The chute 4 is, of course, of suitable length and of a size and pitch that will permit the cups 6 to be packed therein and slide automatically forward by gravity as the foremost cup is removed from time to time.

The faucets 7, 8, Fig. 5, shown in closed position, are of novel design and each consists of a usual barrel 9, with a preferably tapered head 10 therein having a passage $10^a$ therethrough. The faucet stem is of novel and improved construction and comprises an enlarged and hollow or chambered portion 11 having neck 12 seated upon the barrel 9, the chambered section with radially positioned slots 13, and above a base 14 with a stem housing or neck 15 thereon of convenient length. The latter is provided at its upper end with a usual handle 16.

The head 10, Fig. 5, is secured to the neck 12 of the chambered portion 11 of the stem 15 and to the spindle 17 as by a pin 18, the upper end of the spindle carrying a screw 19 to lock the stem 15 and parts 11 and 10 together.

In order that the parts 15 and 11 may be rotatably engaged, the bottom face of the base 14, Figs. 5, 7, is apertured at 20 to receive lugs 21, Fig. 6, upwardly extended from a disk 22, carrying a lug 23 and a similar neck 24 on its edge, and, Fig. 5, seated in the slots 13. Thus manipulation of the handle 16 will open and close the faucet through the parts 15, 22, 11 and 10.

Each faucet 7, 8, Figs. 1, 2, 5, is similarly constructed and in order that they may be operated simultaneously, when desired, a lever 25, Fig. 1, is pivoted to a lug 26 on the front of the urn, and this lever is connected by a link 27 with the handle 16 of faucet 8 and by a link 28 with the handle 29 of faucet 7.

To permit separate use of the faucets, Figs. 2, 4, 5, 6, they are provided with handles 30, 31, shown in closed position, carrying at their inner ends the disks 22 already described, with upwardly extended lugs 21 thereon engaging the slots 20 in the bottom face portion 14, as described. Normally, Fig. 5, the disk 22 is maintained in elevated position by a plurality of coiled springs 36 in the chamber 37.

Individual operation of either faucet can be had by depressing the handle 30 or 31 to release the disk 22 against the spring 36 from its engagement with the member 14 and turning it, the member 11, spindle 17 and head 10 in the proper direction, the spindle 17 turning freely within the member 15. To lock the handle 30 or 31 in opened position, if desired, Fig. 5, a dog 38 is pivoted to the handle 30, the lower end of the dog being inturned at 39 to engage beneath the lower edge of the member 11 when the former is depressed, the loaded upper end 40 of the handle acting to throw the lower end inwardly beneath the member 11 automatically.

To convey the cups from beneath faucet 7 and faucet 8, I have provided the following novel means. In front of the urn, Fig. 1, and either on its base or a separate base, as may be most convenient, is a platform or table 41. This table is provided on its upper face, Figs. 1, 3, with a curved groove 42 in which is slidably seated a similarly curved cup feeder or carrier 43, kept therein by a bead 44 on the table and overlapping the opposite carrier edges. This feeder, Fig. 3, is provided on its lower face with a post 44$^a$ depending through a slot 44$^b$ in the table and having a laterally extended arm 45, the inner end of the arm carrying a pin 46 seated in a slot 47 in an arm 48 on the lower end of a vertical rod 49 mounted to turn in the lug 26 already referred to, and a lower like member 50, Fig. 2, on the urn front, the rod 49 being secured to the end of the faucet operating lever 25 already described.

The Fig. 3 left hand end of the member 43 is beveled to a very thin edge to permit it to slide beneath the bottom of the second cup 6 beneath faucet 7.

In operation, the compartments 2, 3, being filled with, for instance, hot milk and coffee respectively, and the cups being packed on the chute, as in Figs. 1, 2, with one cup 6 directly beneath each faucet 7, 8, the foremost cup being on the carrier 43. The handle 25 is then turned to the left, Figs. 1, 2, sliding the feeder 43 beneath the second cup 6, beneath faucet 7 opening both faucets 7, 8, and drawing coffee for the first cup 6 from faucet 8 and hot milk for the second cup from faucet 7. The sliding of the feeder 43 beneath the cups 6 will not disturb the position of the cup beneath faucet 7 because it will be retained in its position by the edge of the chute 4 and the cup beneath faucet 8 will be moved only slightly depending upon its size, before it will be stopped by contact with the second cup beneath faucet 7. Return of the handle 25 to its closed position, Fig. 2, will cause the feeder 43 to move both cups 6 to the right, and position the foremost cup to the right of faucet 8 to be removed by the waiter, and position the second cup 6 containing hot milk beneath faucet 8. The position vacated by the second cup 6 beneath faucet 7 will be filled by another cup sliding automatically off the chute and directly beneath faucet 7.

The next operation of the handle 25 returns the feeder 43 to the left hand position, Fig. 2, without disturbing the positions of the cups beneath the faucets 7 and 8, since cup under faucet 7 is prevented by the slightly raised end of chute 4 from moving farther to the left, and cup under faucet 8 is likewise prevented by contact on its left with the cup under faucet 7. As the handle 25 is moved to the left and as the feeder 43 slides under the cups beneath faucets 7, 8, the first cup under faucet 7 is filled as before with hot milk while at the same time the second cup under faucet 8 is filled with coffee. The turn of the handle to the right will bring the cup 6 from beneath faucet 8 to the right of faucet 8 again where it may easily be picked up, and the cup filled with milk from faucet 7 is brought beneath the faucet 8 ready to be filled with coffee, while another cup having slid down from the chute to a position beneath faucet 7 is ready to be supplied with hot milk, the cups automatically positioning themselves beneath the faucet 7 from the chute as the leading cup is removed by the feeder 43.

This mode of operation is preferred during rush hours, but at other times when it is not desired to keep a cup supplied with hot milk ready at all times, the handle 30 on faucet 8 is depressed and held down by the dog 38 thereon as described, throwing the faucet 8 out of operation, the handle 25 being used to fill cups with hot milk from faucet 7 and position them under the coffee faucet 8 where they may be filled with coffee by operating the independent handle 30 as desired.

If it is desired to use a single urn or compartment, for instance 3, for a beverage, as milk, orangeade or the like, even regularly during a certain period, and also use the carrier, it can be readily done by providing only the faucet 7, and then using the lever 25 which will throw the feeder to the left, Fig. 1, each time it is actuated to open faucet 7 and the carrier will, therefore, carry a filled cup or glass to the right each time the lever is turned to the right, permitting a second cup or glass to drop from the chute beneath faucet 7 as desired.

The above described arrangement will facilitate very much the handling of cups or glasses in connection with either one or two faucets, and enable one waiter or attendant to serve more customers with less noise and confusion.

My invention is not limited to the particularly embodiment thereof described and illustrated herein.

Claims:

1. A beverage serving device comprising a container having a plurality of compartments with faucets, a cup magazine therefor holding the cups in unnested relation, means for feeding the cups to the faucets and means for operating the faucets simultaneously.

2. A beverage serving device comprising a container with a plurality of compartments, faucets for the container, an inclined cup magazine, and means for feeding the cups to each faucet simultaneously.

3. A beverage serving device comprising a plurality of compartments with an inclined chute-like cup magazine, faucets for the compartments and means for operating the faucets simultaneously and means controlled by the faucet operating means for feeding the cups to each faucet simultaneously.

4. A beverage serving device comprising a multi-compartment container, faucets therefor, simultaneously operating means therefor, an inclined cup magazine and a cup feeding carrier constructed to move backwardly and forwardly beneath the cups to feed them to the faucets.

5. A beverage serving device comprising a multi-compartment container, faucets therefor, simultaneously operating means therefor, an inclined cup magazine and a cup feeder constructed to move backwardly and forwardly beneath the cups to feed them to the faucets, and means including a rod, and connections between it, the cup feeder and faucets to operate the carrier and faucets simultaneously.

6. In a beverage serving device, a plurality of compartments, individually operable faucets therefor, a cup feeder and means also for simultaneously operating the faucets and feeder.

7. In a beverage serving device, a plurality of faucets individually operable, a cup feeder, and means for connecting the faucets to the feeder for simultaneous faucet and cup feeding action while still free for individual non-cup feeding action.

8. In a beverage serving device, a container with a spiral magazine supplying therefrom in side by side relation cups capable of repeated use and a faucet, a cup feeding device and connections between the faucet and device acting to feed a cup to the faucet and a cup from the faucet each time it is opened and closed.

9. In a beverage serving device, a container with a spiral cup magazine acting normally to feed a cup first in an inclined and then part way in an upright position, and a faucet, a cup feeding device receiving the cup at the magazine end and positively carrying it in a curved path to the faucet.

10. In a beverage serving device, a container with a spiral magazine thereabout constructed to hold in an upright position relative thereto cups of sufficient weight to feed themselves normally downwardly and in continued proper relation and order, a faucet, a cup feeding device receiving the cups successively from the magazine and conveying it continuously forwardly to the faucet.

11. In a beverage dispensing device including a container with a faucet, control means therefor, a reciprocating cup carrier with a sharp edge permitting it to slide beneath, raise and convey a cup for filling and delivery, and connections between the container, faucet and carrier insuring feeding action by the carrier through operation of the faucet control.

In testimony whereof, I have signed my name to this specification.

GEORGE M. KENDALL.